(12) United States Patent
Knapp et al.

(10) Patent No.: US 8,090,736 B1
(45) Date of Patent: Jan. 3, 2012

(54) ENHANCING SEARCH RESULTS USING CONCEPTUAL DOCUMENT RELATIONSHIPS

(75) Inventors: Sean Michael Knapp, Palo Alto, CA (US); Matthew Eric Waddell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 703 days.

(21) Appl. No.: 11/024,966

(22) Filed: Dec. 30, 2004

(51) Int. Cl.
*G06F 17/30* (2006.01)
(52) U.S. Cl. .......... 707/760; 707/769; 705/23; 715/515
(58) Field of Classification Search .................. 707/760, 707/999.004
See application file for complete search history.

(56) References Cited

U.S. PATENT DOCUMENTS

| | | | |
|---|---|---|---|
| 5,787,426 A * | 7/1998 | Koshiba et al. ................ 707/7 |
| 6,285,999 B1 | 9/2001 | Page ................................ 707/5 |
| 6,601,075 B1 * | 7/2003 | Huang et al. ............. 707/104.1 |
| 6,604,099 B1 * | 8/2003 | Chung et al. ................... 707/3 |
| 7,181,438 B1 * | 2/2007 | Szabo ............................... 707/2 |
| 2002/0138541 A1 * | 9/2002 | Wolff et al. .................... 709/1 |
| 2003/0182310 A1 * | 9/2003 | Charnock et al. ......... 707/104.1 |
| 2004/0093323 A1 * | 5/2004 | Bluhm et al. .................... 707/3 |
| 2004/0133557 A1 * | 7/2004 | Wen et al. ........................ 707/3 |
| 2005/0022132 A1 * | 1/2005 | Herzberg et al. ............ 715/759 |
| 2005/0091674 A1 * | 4/2005 | Knight et al. ................ 719/332 |
| 2005/0154979 A1 * | 7/2005 | Chidlovskii et al. .......... 715/513 |
| 2006/0080405 A1 * | 4/2006 | Gibson ........................ 709/218 |
| 2006/0277205 A1 * | 12/2006 | Song et al. .................... 707/102 |

OTHER PUBLICATIONS

"Gmail™: Getting Started with Gmail", http://www.google.com/gmail/help/start.html, Dec. 30, 2004 (Print Date), 3 pp.
"Finder—Everything you need, just a click away", http://www.apple.com/macosx/features/finder/, Dec. 30, 2004, (Print Date), 2 pp.
Stefanie Olsen, "Yahoo wants users to get personal with search", Oct. 4, 2004, 2 pages.

* cited by examiner

*Primary Examiner* — Shyue Jiunn Hwa
(74) *Attorney, Agent, or Firm* — Harrity & Harrity, LLP

(57) ABSTRACT

A system identifies user-defined organizational relationships between documents in a collection of documents. The system ranks the documents based on the identified relationships. In response to a user search query, a listing of matching documents is identified. The listing of matching document is presented to the user based on document ranks.

36 Claims, 8 Drawing Sheets

ENHANCING SEARCH RESULTS USING CONCEPTUAL DOCUMENT RELATIONSHIPS

BACKGROUND

1. Field of the Invention

Implementations described herein relate generally to information storage, more particularly, to systems and methods for facilitating retrieval of stored information.

2. Description of Related Art

Modern computer networks have made large bodies of information widely and easily available. Search engines, for instance, may index many millions of web documents that are linked to the Internet. A user connected to the Internet can enter a simple search query to quickly locate web documents relevant to the search query.

However, systems designed to facilitate location and retrieval of other types of documents, such as word processing documents, spreadsheets, etc., are typically not as robust. For example, conventional document search techniques may index content included within a document as well as additional data such as the author of the document and its dates of creation and modification. Moreover, such documents are typically stored based on a user-generated directory structure e.g., c:\my documents\work documents. Accordingly, such documents may be searchable based only on the textual information contained within the document and information gleaned from the directory structure applied by the creator of the document. Finding relevant information in such a document storage environment can be difficult. A user may need to properly identify information contained in the document or traverse several layers of directory structures to find documents which may be relevant.

SUMMARY

According to one aspect, a method may include identifying a plurality of documents. User-defined relationships between the plurality of documents may be identified. Ranking values may be assigned to the plurality of documents based on the identified user-defined relationships.

According to another aspect, a method may include associating one or more organizational structures to a plurality of documents, where each organizational structure identifies a relationship between one or more documents. The plurality of documents are ranked based on the associated organizational structures.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Figure 1:
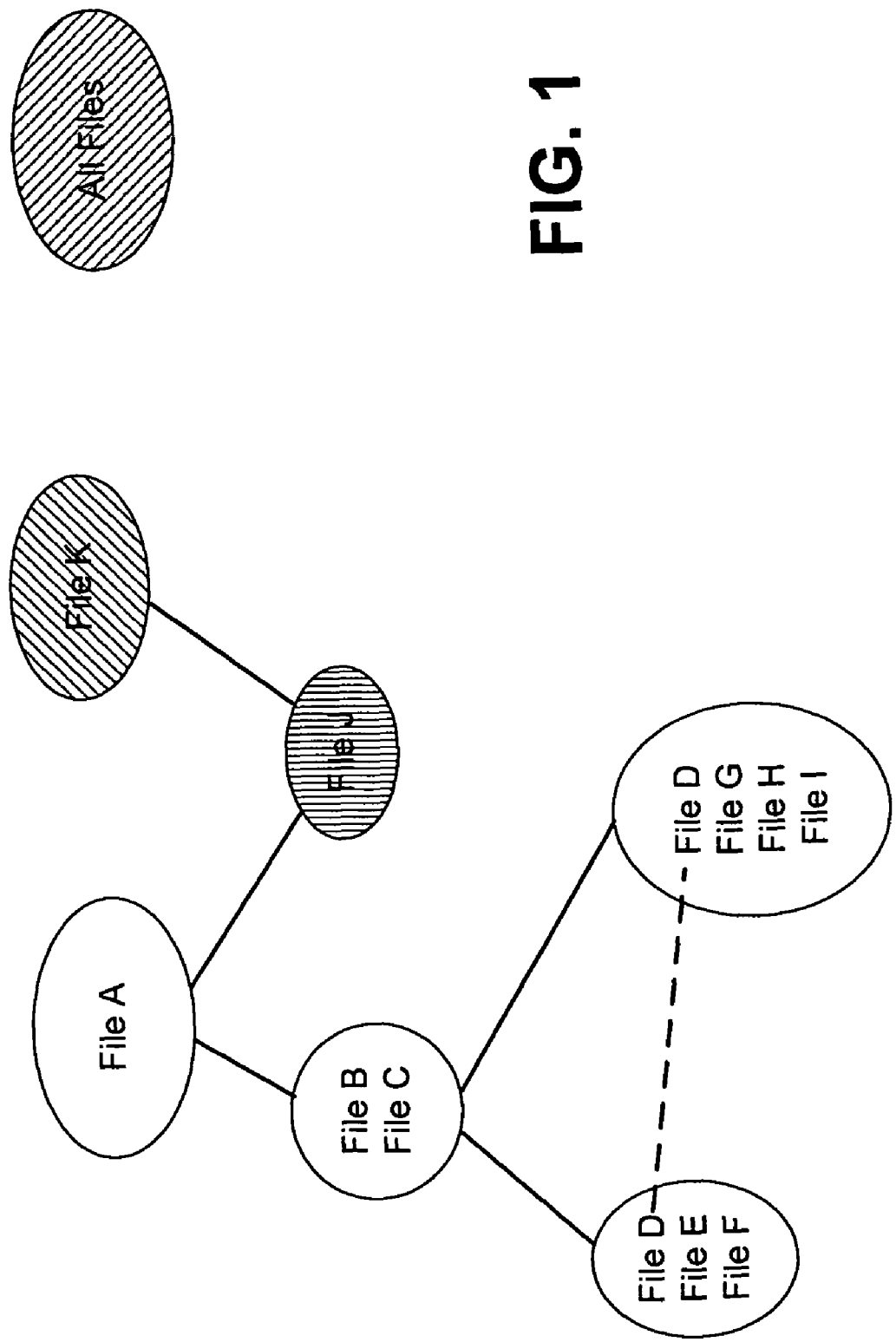
FIG. 1 is a diagram of a hierarchical organization of document files consistent with principles of the invention.

FIG. 1 is a diagram of a hierarchical organization of document files. As shown in FIG. 1, the hierarchical organization includes files that are positioned within or beneath other files from an organization standpoint. For example, Files B and C and beneath File A. Accordingly attributes associated with File A may be associated with Files B and C, while attributes of Files B and C are indirectly associated with File A. Further File J as a child of both File A and File K, shares attributes with each parent, this forming a relationship between both File A and File K.

Systems and methods consistent with the principles of the invention may score documents using, for example, one or more such conceptual organizational structures applied to the documents. The systems and methods may use these scores to provide high quality search results.

A "document," as the term is used herein, is to be broadly interpreted to include any machine-readable and machine-storable work product. A document may include a word processing document, a spreadsheet document, an e-mail, a digital photograph, a digital music file, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Java Script, etc.). A "link," as the term is used herein, is to be broadly interpreted to include any relationship between documents in a collection.

Exemplary Network Configuration

Figure 2:
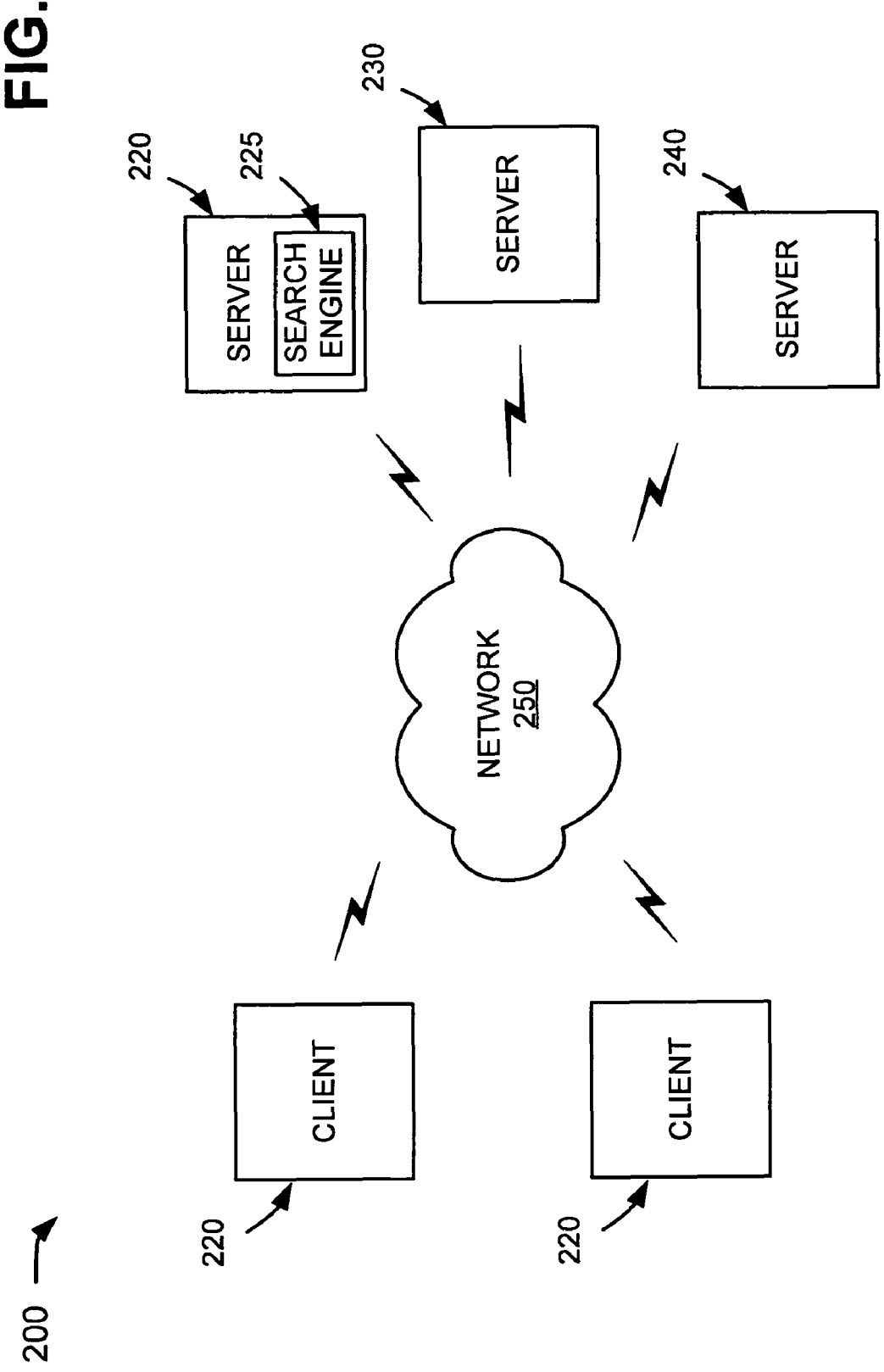
FIG. 2 is a diagram of an exemplary network in which systems and methods consistent with the present invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Network 250 may include a local area network (LAN), a wide area network (WAN), a telephone network, such as the Public Switched Telephone Network (PSTN), an intranet, the Internet, a memory device, another type of network, or a combination of networks. Two clients 210 and three servers 220-240 have been illustrated as connected to network 250 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention. Clients 210 and servers 220-240 may connect to network 250 via wired, wireless, and/or optical connections.

In an implementation consistent with the principles of the invention, server 220 may include a search engine 225 usable by clients 210. Server 220 may crawl a corpus of documents including any conceptual organization structures that further include or reference the documents, index the documents, and store information associated with the documents in a repository of crawled documents. Servers 230 and 240 may store or maintain documents that may be crawled by server 220. Such documents may include data related to published news stories, products, images, user groups, geographic areas, or any other type of data. For example, server(s) 215 may store or maintain news stories from any type of news source, such as, for example, the Washington Post, the New York Times, Time magazine, or Newsweek. As another example, server(s) 215 may store or maintain data related to specific product data, such as product data provided by one or more product manufacturers. As yet another example, server(s) 215 may store or maintain data related to other types of web documents, such as pages of web sites.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Exemplary Client/Server Architecture

Figure 3:
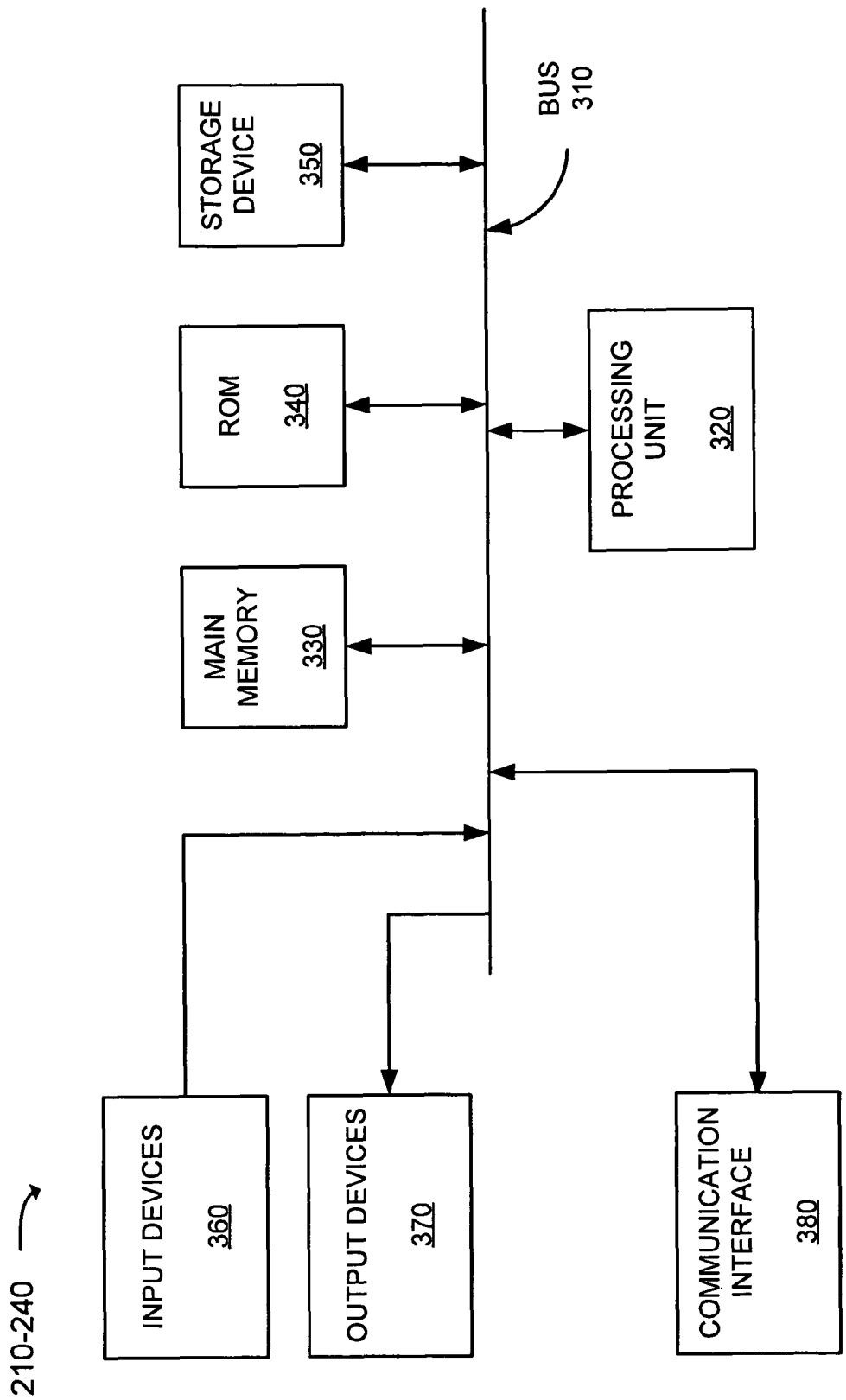
FIG. 3 is an exemplary diagram of a client and/or server of FIG. 2 in an implementation consistent with principles of the invention.

FIG. 3 is an exemplary diagram of a client or server entity (hereinafter called "client/server entity"), which may correspond to one or more of clients 210 and servers 220-240, according to an implementation consistent with the principles of the invention. The client/server entity may include a bus 210, a processing unit 320, a main memory 330, a read only memory (ROM) 340, a storage device 350, one or more input devices 360, one or more output devices 370, and a communication interface 380. Bus 310 may include one or more conductors that permit communication among the components of the client/server entity.

Processing unit 320 may include any type of software, firmware or hardware implemented processing device, such as, a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input device(s) 360 may include one or more conventional mechanisms that permit an operator to input information to the client/server entity, such as a keyboard, a mouse, a pen, voice recognition and/or biometric mechanisms, etc. Output device(s) 370 may include one or more conventional mechanisms that output information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, perform certain document organization and searching-related operations. The client/server entity may perform these operations in response to processing unit 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Search Engine

Figure 4:
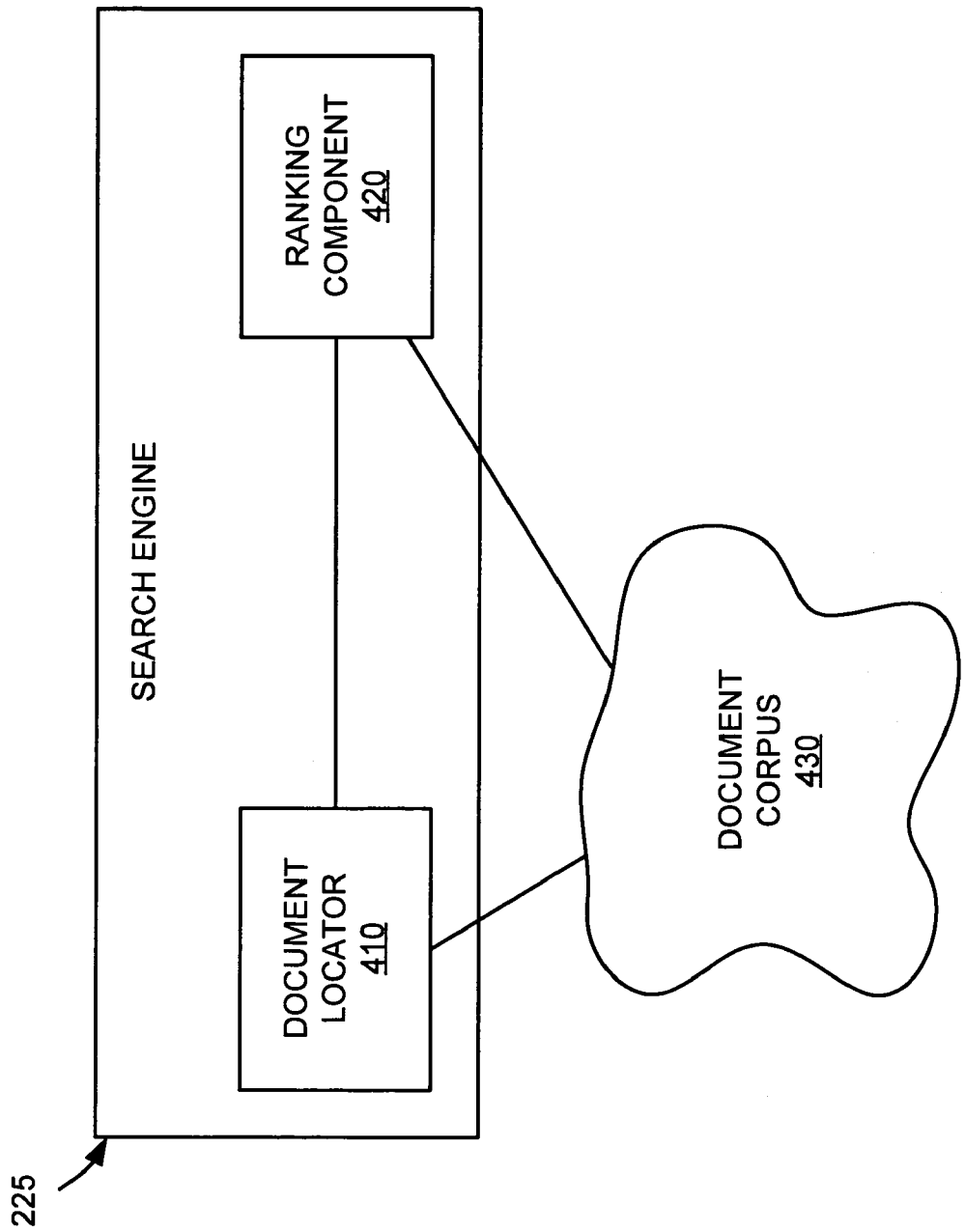
FIG. 4 is a block diagram illustrating an implementation of an exemplary search engine consistent with principles of the invention.

FIG. 4 is an exemplary functional block diagram of search engine 225 according to an implementation consistent with the principles of the invention. Search engine 225 may include document locator 410 and ranking component 420. As shown in FIG. 4, document locator 410 may connect to a document corpus 430. Document corpus 430 may include information associated with documents that were previously crawled, indexed, and stored, for example, in a database accessible by search engine 225.

As will be described in additional detail below, document locator 410 may identify a set of documents in response to a user search query. Document locator 410 may initially locate documents from document corpus 430 by comparing the terms in the user's search query to the documents in corpus 430.

Ranking component 420 may assign a ranking score (also called simply a "score" herein) to one or more documents in document corpus 430. Ranking component 420 may assign the ranking scores prior to, independent of, or in connection with a search query. When the documents are associated with a search query (e.g., identified as relevant to the search query), search engine 225 may sort the documents based on the ranking score and return the sorted set of documents to the client that submitted the search query. Consistent with aspects of the invention, the ranking score is a value that attempts to quantify the quality of the documents. In implementations consistent with the principles of the invention, the score is based, at least in part, on the degree to which documents within corpus 430 are related to one another.

Exemplary Organizational Structures

According to one implementation consistent with principles of the invention, logical or conceptual organizational structures associated with stored documents may be used by ranking component 420 to generate or modify a score associated with the document. As will be described in additional detail below, such organizational structures may include logical directory structures, conceptual or virtual directory structures, or other organizational structures designed to facilitate organization and retrieval of documents.

Figure 5:
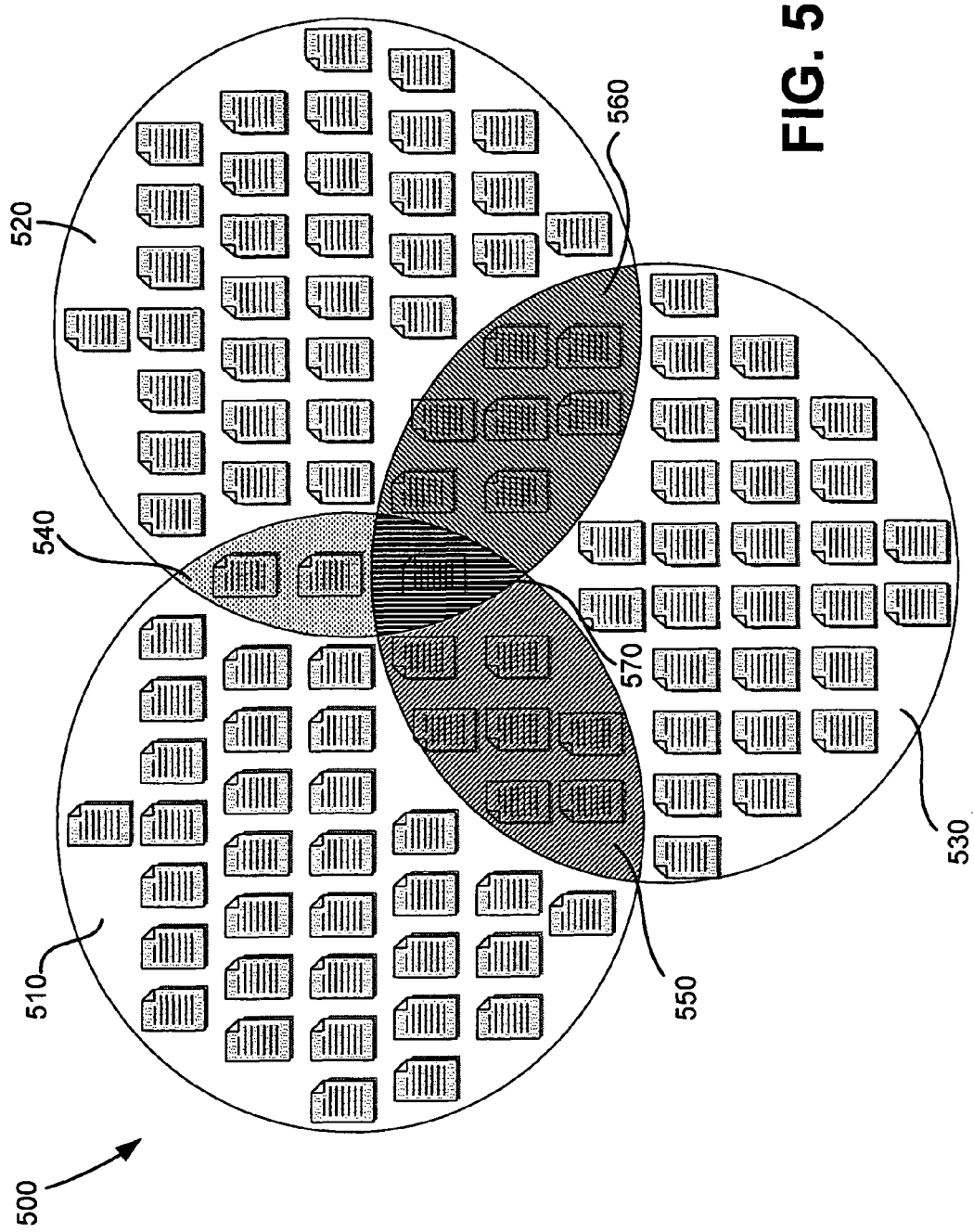
FIG. 5 is a diagram illustrating one exemplary organizational structure consistent with principles of the invention.

FIG. 5 is a diagram illustrating one exemplary organizational structure consistent with principles of the invention. As shown, a global collection of documents 500 may include three sub-collections of documents 510, 520, and 530 identified and grouped together in a suitable manner. Although illustrated as a collection of documents, document collection 500 may, in practice, refer to an index or other virtual representation of the documents in collection 500, thereby enabling manipulation and organization without requiring modification of the original documents themselves. Consistent with principles of the invention, one suitable grouping methodology may include the application of document labels or sub-labels to each document in the collection to indicate a relationship between each document in the collection. For example, each document in collection 510 may have a "sales pitch" label applied thereto, each document in collection 520 may have a "presentation" label applied to it, and each document in collection 530 may have a "meeting agenda" label applied to it. The labels for each collection may be assigned by the same or different individuals having access to the documents. As shown in FIG. 5, multiple documents from each of collections 510, 520, and 530 have multiple labels attached thereto, thereby resulting in overlapping labels. More particularly, documents in region 540 have both the "sales pitch" and "presentation" labels applied thereto, the documents in region 550 have both the "sales pitch" and "meeting agenda" labels applied thereto, the documents in region 560 have both the "presentation" and "meeting agenda" labels applied thereto, and the documents in region 570 have each of the "sales pitch", "presentation", and "meeting agenda" labels attached.

By supporting the application of document labels by multiple users to documents within global collection 500, the "relationships" between the documents in the collection as established by the various users may be "mined" to provide more relevant search results during subsequent document searches. In practice the labeling system may be extended across many documents and users, thereby providing a potential relationship between each document and every other document in the global collection. Furthermore, the above-described labeling scheme may be hierarchical in nature, supporting various levels of labeling through the use of sub-labels. In this manner, relationships between documents in collection 500 may be more clearly defined.

In a further implementation consistent with principles of the invention, in addition to the relationships between various documents evidenced by labels applied thereto, document relationships may also be evidenced by relative positioning in a conventional logical file system. For example, all documents in a particular directory or subdirectory on a hard disk drive or other storage medium may be considered to be related. In one exemplary implementation, a degree of relatedness between various documents may be identified based on the similarity of their respective logical locations. For example, documents having a common parent directory, but different subdirectories may still be considered to be related, but may have a lesser degree of relatedness than documents sharing a common subdirectory. In this manner, additional information irrespective of document content may be used to index, rank or relate documents in the collection to each other.

In yet another implementation consistent with principles of the invention, relationships between documents may be evidenced by additional user-specific grouping methodologies, such as bookmarks, shortcuts, or the like. In practice, users may navigate to various documents (e.g., web pages, etc.) and store bookmarks to the various documents in a specific folders and subfolders on a storage medium. By leveraging a user's unique organization via bookmarked documents, additional degrees of relationship between various documents in a collection may be identified and used to enhance search results during subsequent queries.

Exemplary Document Ranking Process

Figure 6:
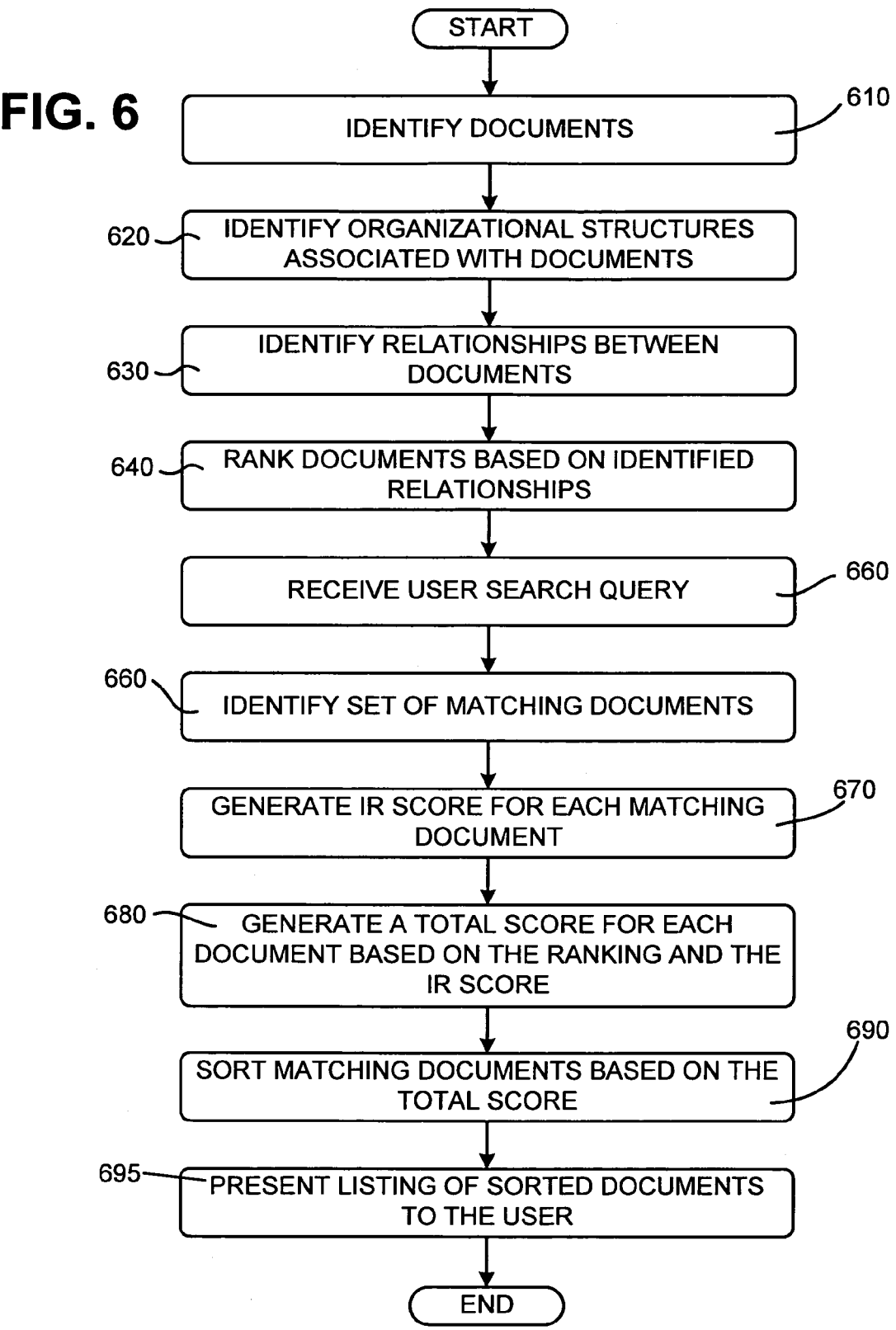
FIG. 6 is a flow diagram illustrating an exemplary process for ranking and presenting documents according to an implementation consistent with principles of the invention.

FIG. 6 is a flow chart of an exemplary process for ranking and presenting documents to a user according to an implementation consistent with principles of the invention. As one skilled in the art will appreciate, the process exemplified by FIG. 6 can be implemented in software and stored on a computer-readable memory, such as main memory 330, ROM 340 or storage device 350 of server 220. In other implementations, the process exemplified by FIG. 6 can be implemented in hardwired circuitry, such as combinational logic, within processing unit 320 of server 220.

The exemplary process may begin with search engine 225 detecting or otherwise identifying a set of documents from a global collection of documents 400 (act 610). Organizational structures or other user-defined relationships associated with the documents may then be identified (act 620). As described in detail above, the organizational structures may include a label or sub-label applied to the documents, the documents' logical locations in a file system, or other unique user-specific organizational structures applied to the documents (e.g., bookmark locations). Relationships between documents in collection 400 of documents may be identified based upon the identified organizational structures associated with the documents (act 630).

Search engine 225 may use the relationships between the various documents in the document corpus to generate a ranking or score for each document in the collection 400 (act 640). For example, a document in global collection 400 that has not been independently labeled in the manner set forth above may be scored lower than a document that has been independently labeled by one or more users.

In one specific implementation, a document's ranking may be based on a number of documents sharing one of the labels attached to the document. In this manner, a document sharing labels with a greater number of documents will have a higher ranking than a document sharing label(s) with fewer documents. In another implementation, search engine 225 may use a link-based ranking method, similar to the PageRank™ method described in U.S. Pat. No. 6,285,999, the entirety of which is incorporated herein by reference.

According to one implementation of a link-based ranking methodology, individual documents within global collection 400 may be ranked based upon relationships between the various documents or sub-collections (e.g., 410-470) within collection 400. These relationships may include related labeling elements, data structures, or other document grouping methodologies. Once document relationships have been established (as in act 630), the relationships may be represented as links to the various documents in collection 400. For example, by grouping all documents in collection 410 together under the label "sales pitch", each document in collection 410 may be considered to be linked to each other document in collection 410, regardless of document content or the document's relative position in the logical file system.

Additionally, because several documents in collection 440 include labels for both collection 410 and collection 420, these documents may be considered to be similarly linked to each document in both collection 410 and 420, thus, increasing their ranking.

In accordance with one exemplary implementation, a document's rank may be based on the number of links from different documents that "point to" the document in question. In this manner, documents related to a large number of documents through one or more labels may have a higher ranking than a document having fewer labels and/or fewer related documents.

In an alternative implementation, document rankings may also be based on the individual rankings of the various related documents such that a relationship with a highly ranked document is considered more important than a relationship with a lowly ranked document. In this manner, it may be possible for a document with only one linked document (from a very highly ranked document) to have a higher rank than another document having many related documents (from very low ranked documents).

In one implementation consistent with principles of the invention, the rank or score of a document may be defined according to:

$$r(A) = \frac{\alpha}{N} + (1-\alpha)\left(\frac{r(R_1)}{|R_1|} + \ldots + \frac{r(R_n)}{|R_n|}\right),$$

where A is the document being ranked; $R_1, \ldots, R_n$ are the documents related to document A; $r(R_1), \ldots, r(R_n)$ are the ranks of documents $R_1, \ldots, R_n$; $|R_1|, \ldots, |R_n|$ are the number of links for documents $R_1, \ldots, R_n$; $\alpha$ is a constant in the interval [0,1]; and N is the total number of documents in the collection.

The ranks form a probability distribution over the documents in the collection, so that the sum of ranks over all web documents is unity. The rank of a document can, therefore, be defined as the probability that a user will be at the document after following a large number of links between documents. The constant $\alpha$ in the above equation may be interpreted as the reset probability that the user will jump randomly to any document instead of following a link. Because ranking of the documents in this manner takes the ranks of other documents into consideration, the rankings may be calculated using an iterative algorithm. By continually determining document rankings over a range of iterations, document rankings may be revised until the rankings are considered to be "sufficiently converged." "Sufficiently converged" may be determined when the document ranks generally stop changing, within a certain error tolerance, from one pass to the next. In practice, ranking generally becomes sufficiently converged with about 100 iterations.

In another implementation consistent with principles of the invention, document rankings may be based on various criteria associated with other documents related by the organizational structures identified above. For example, documents having a high degree of relatedness (e.g., a shared label, logical sub-directory, or bookmark folder) may contribute more positively to the ranking of a given document than those documents having a lower degree of relatedness (e.g., sibling folder labels, sibling sub-directories, etc.). In this example, even though each document includes a label related to the parent collection, the existence of distinct sibling labels may reduce the relatedness of the documents and may, correspondingly, have a reduced effect on document ranking.

Examples of additional degrees of relatedness may include indirect relationships. For example, consider a document within a collection labeled "A" that shares one or more documents with a collection label "B," that in turn shares one or more documents with a collection labeled "C." In this example, documents from the collection labeled "C" may be considered less related to documents from the collection labeled "A" than documents from the collection labeled "B." Accordingly, documents from the collection labeled "C" may have a reduced effect on the ranking of documents from the collection labeled "A" than those documents from collection labeled "B."

In still another exemplary implementation, the number of discrete labels applied by different users to a particular document may have a positive effect on the documents rank. In this example, discrete labels applied by different users may indicate an important or valuable document. Accordingly, even if a number of documents related to the document is low, the documents relative importance may be used to bolster the document's ranking. Once each document in collection 400 has been ranked in the manner described above, search engine 225 is ready to receive a user search query (act 650).

Once a search query has been received, search engine 225 may identify a set of documents that match the search query by comparing the search terms in the query to documents in collection 400 (act 660). There are a number of known techniques that search engine 225 may use to identify documents related to a set of search terms. For example, when the set of search terms includes a single search term, search engine 225 might identify documents that contain the search term. When the set of search terms includes multiple search terms, search engine 225 might identify documents that contain the search terms as a phrase. Alternatively or additionally, search engine 225 might identify documents that contain the search terms, but not necessarily together. Alternatively or additionally, search engine 225 might identify documents that contain less than all of the search terms, or synonyms of the search terms. Additionally, in accordance with principles of the invention, search engine 225 may identify documents that have labels that include some or all of the search terms. Further, search engine 225 may identify documents that do not contain all of the search terms, but that are related to documents which include the search terms within a predetermined degree of relatedness. Yet other techniques for identifying relevant documents are known to those skilled in the art.

Once matching documents have been identified, search engine 225 may generate an information retrieval (IR) score for the identified documents (act 670). There are a number of known techniques that search engine 225 may use to generate an IR score for a document. For example, search engine 225 may generate an IR score based on the number of occurrences of the search terms in the document. Alternatively or additionally, search engine 225 may generate or modify an IR score based on where the search terms occur within the document (e.g., document label, logical file path, title, content, header, footer, etc.) or characteristics of the search terms (e.g., font, size, color, etc.). Alternatively or additionally, search engine 225 may weight a search term differently from another search term when multiple search terms are present. Alternatively or additionally, search engine 225 may consider the proximity of the search terms when multiple search terms are present. Yet other techniques for generating an IR score for a document are known to those skilled in the art.

Search engine 225 may generate total scores for the matching documents based on a combination of their IR scores and relationship-based scores or ranks associated with the documents (act 680). The matching documents may then be sorted based on the total scores (act 690) and an indication of the matching documents may be provided to the user in a suitable manner (act 695). In displaying the matching results to the user, search engine 225 may further form references to the documents, where a reference may include a title of the document (which may contain a hypertext link that will direct the user, when selected, to the actual document) and, optionally, a text excerpt from the document. Search engine 225 may then present the references corresponding to a number of top-scoring documents (e.g., a predetermined number of documents, documents with scores above a predetermined threshold, all documents, etc.) to a user who submitted the search query.

Exemplary Relationship Management Interface

Figure 7:
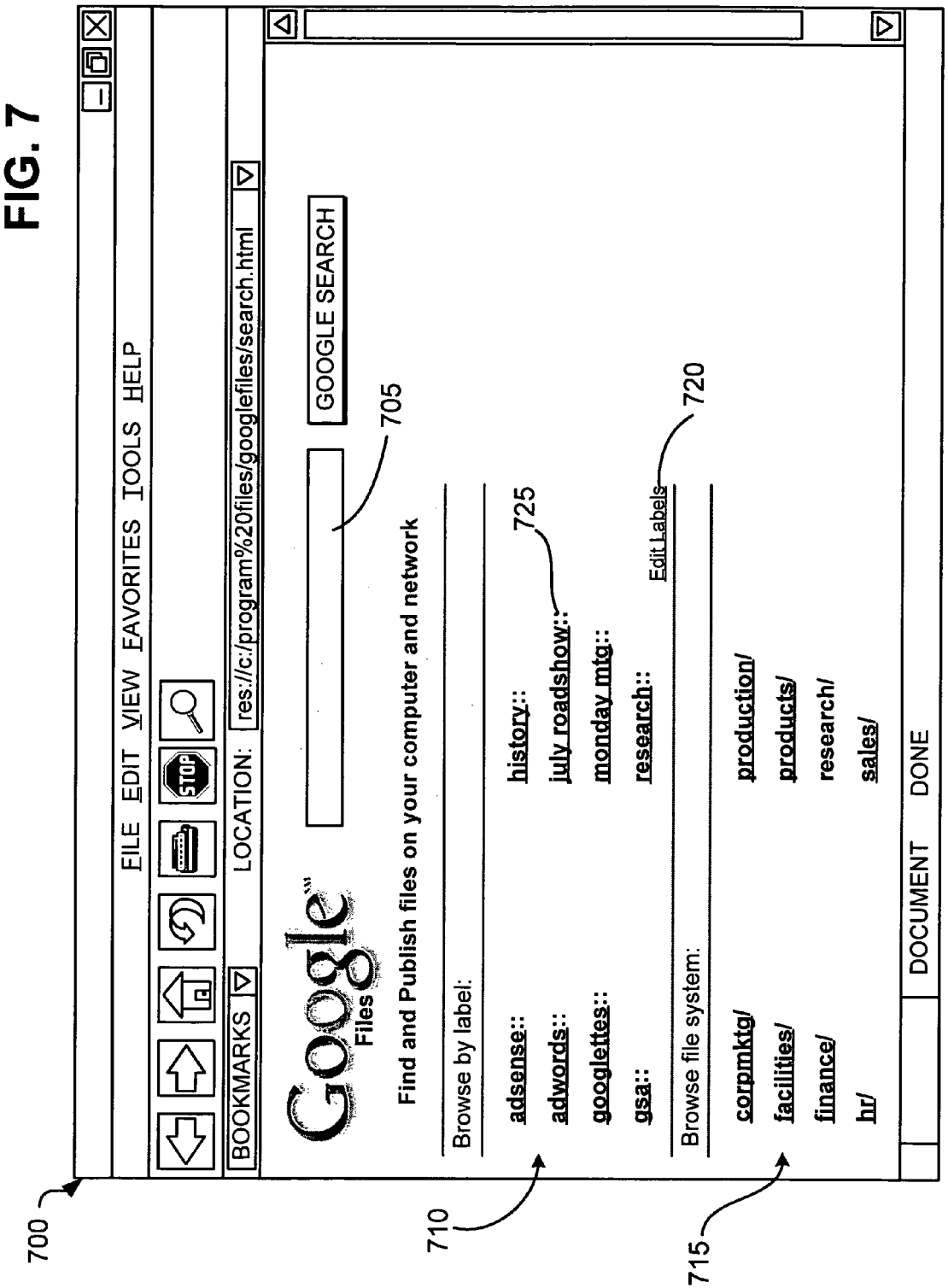
FIG. 7 is an exemplary graphical user interface for searching and managing document relationship information consistent with principles of the invention.

FIG. 7 is an exemplary diagram of a graphical user interface 700 for searching documents and managing or viewing document relationship information according to an implementation consistent with principles of the invention. As illustrated, interface 700 may include a search box 705 for receiving user entered search terms. In addition to document search facilitation, interface 700 also includes several "browse by" sections 710, 715 for facilitating a more conventional "drill down" document search based upon user-assigned labels in section 710 or the existing directories in the logical files system in section 715. In one exemplary implementation, each section includes hyperlinks relating the various labels and file system directories. An "edit labels" hyperlink 720 may also be included in section 710 for enabling users to edit the labels currently applied to various documents.

Figure 8:
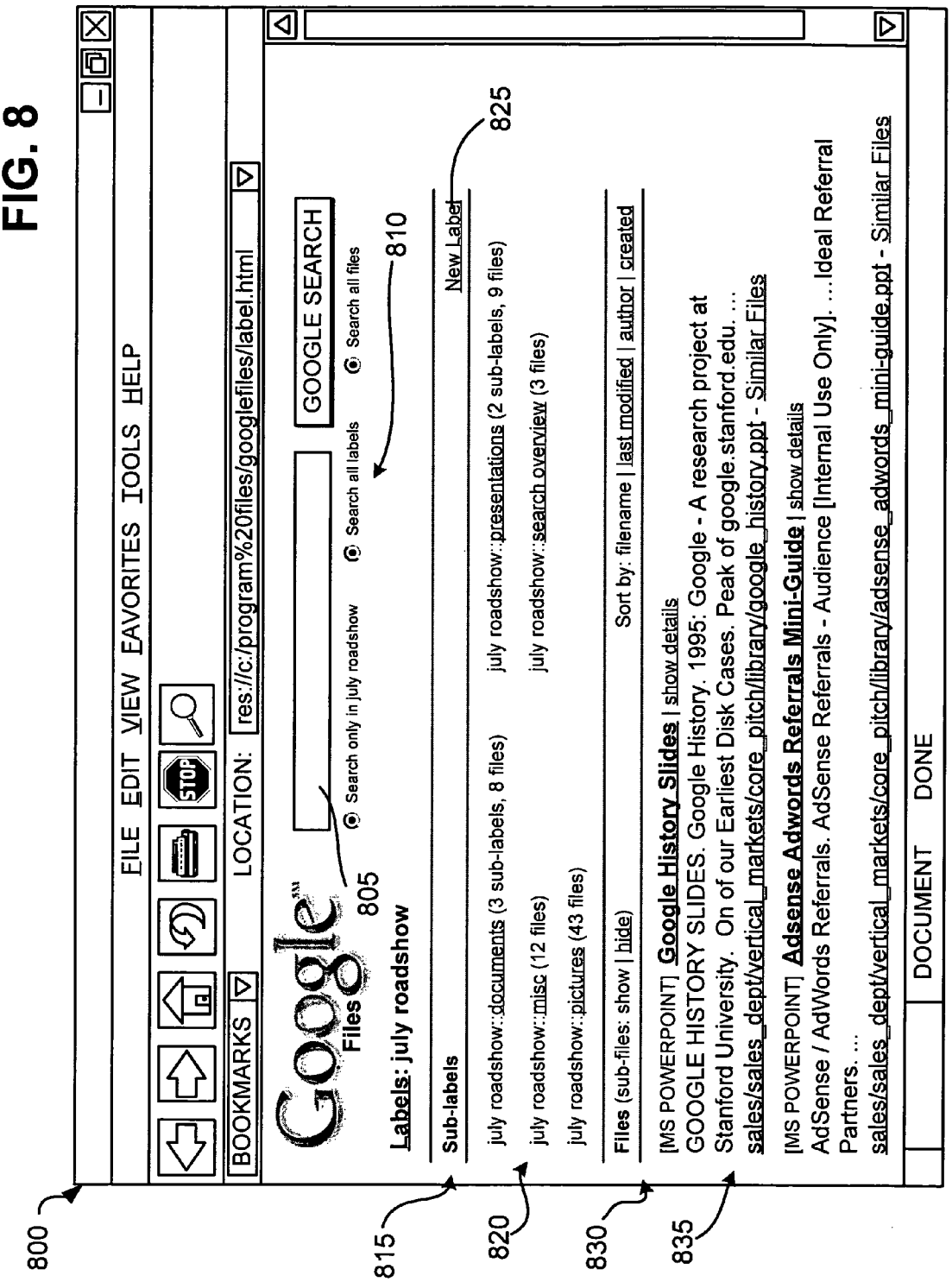
FIG. 8 is an exemplary graphical user interface for viewing and modifying document relationship information consistent with principles of the invention.

Upon selection of a label or logical file system directory hyperlink, for example label "july roadshow" hyperlink 725 in browse by label section 715, a graphical user interface 800 may be displayed to the user, as illustrated in FIG. 8. Graphical user interface 800 may include various elements for enabling the user to locate documents or groups of documents within having the selected label applied thereto. For example, a search box 805 similar to search box 705 may be provided for receiving user entered search terms. In addition, user-selectable buttons 810 may be provided for enabling the user to indicate whether a query entered in search box 805 is to be searched only in the selected label, within all labeled documents, or within all files in the document collection.

A sub-labels section 815 may be provided including a hyperlinked listing 820 of sub-labels contained with the selected label. Selection of any hyperlinked sub-label may result in the display of an interface similar to interface 800 relating to the selected sub-label. Additionally, a "new label" hyperlink 825 may be provided to enable users to create a new label within the selected label or sub-label. A files section 830 may be provided including a hyperlinked listing 835 of files having the selected label applied thereto. In an exemplary implementation, each document in the hyperlinked listing 835 may include a "show details" hyperlink. Upon selection of a particular document's "show details" hyperlink, an additional graphical user interface may be displayed for facilitating summary viewing of the document and for enabling modification or supplementation of the document's label(s).

CONCLUSION

Systems and methods consistent with the principles of the invention may perform a search to identify documents based on a search query and use information regarding user-generated relationships between documents to rank the identified documents. The categories may be used to further define the search and present a user with results that are relevant to the user's interests.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 5, the order of the acts may be modified in other implementations consistent with the principles of the invention. Further, non-dependent acts may be performed in parallel.

Also, exemplary user interfaces have been described with respect to FIGS. 6 and 7. In other implementations consistent with the principles of the invention, the user interfaces may include more, fewer, or different pieces of information.

The document relationships described are merely exemplary. It should be understood that additional types of document relationships may be implemented and used to indicate a degree of relatedness between different documents in a collection.

Further, certain portions of the invention have been described as a "component" that performs one or more functions. Such a component may include hardware, such as an application specific integrated circuit or a field programmable gate array, software, or a combination of hardware and software.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a computer system, the method comprising:
   selecting, using one or more processors associated with the computer system, a first document;
   representing, using one or more processors associated with the computer system, a first relationship between the first document and a second document as a first link between the first document and the second document, where the first relationship includes at least one of:
   the first document and the second document sharing a same hierarchical user-defined label,
   the first document and the second document being associated with a same sub-directory, or
   the first document and the second document being associated with a same bookmark folder;
   representing, using one or more processors associated with the computer system, a second relationship between the first document and a third document as a second link between the first document and a third document, where the second relationship includes at least one of:
a hierarchical user-defined label associated with the first document and a hierarchical user-defined label associated with the third document being sibling labels,
a sub-directory associated with the first document and a sub-directory associated with the third document being sibling sub-directories, or
a bookmark folder associated with the first document and a bookmark folder associated with the third document being sibling bookmark folders; and
assigning, using one or more processors associated with the computer system, a rank score to the first document based on the first link and based on the second link, where the first link contributes more to the rank score than the second link.

2. The method of claim 1, where the hierarchical user-defined labels are assigned to the first document by a number of unique users.

3. The method of claim 1, comprising:
representing a third relationship between the second document and a fourth document as a third link between the second document and the fourth document, where the third relationship includes the second document and the fourth document sharing a same hierarchical user-defined label that is not shared by the first document; and
modifying the rank score of the first document based on the third link and based on a rank score associated with the fourth document.

4. The method of claim 3, where the fourth document comprises a number of intermediary documents, where each of the intermediary documents shares at least one hierarchical user-defined label with at least one other intermediary document.

5. The method of claim 3, where the third link and a rank score associated with the fourth document have less effect on the rank score of the first document than the first link.

6. The method of claim 1, where the rank score assigned to the first document is based on a rank score of the second document and a rank score of the third document.

7. The method of claim 1, further comprising:
determining, for the first document, a number of other documents that share the same user-hierarchical label with the first document, are associated with the same sub-directory as the first document, or are associated with the same bookmark folder as the first document; and
where assigning the rank score to the first document is further based on the number of other documents.

8. The method of claim 1, further comprising:
receiving a search query from a user;
identifying the first document based on the received search query;
calculating an information retrieval score for the first document;
calculating a total score for the first document based on the information retrieval score and the assigned rank score; and
providing, for display, the first document together with other identified documents to the user, where the position of the first document among the other identified documents is based on the total score.

9. A method performed by a computer system, the method comprising:
receiving, using a communication interface associated with the computer system, labels for a first document from a plurality of different users;
detecting, using one or more processors associated with the computer system, a first link between the first document and a second document, based on at least one of the received labels matching a label associated with the second document;
detecting, using one or more processors associated with the computer system, a second link between the first document and a third document, based on at least one of the received labels and a label associated with the third document being sibling labels;
assigning, using one or more processors associated with the computer system, a rank score to the first document based on the first link and based on the second link, where the first link contributes more to the rank score than the second link, and where the rank score is further based on a quantity of the different users;
detecting, using one or more processors associated with the computer system, a third link between the second document and a fourth document, based on the second document and the fourth document sharing a same label that is not shared by the first document; and
modifying, using one or more processors associated with the computer system, the rank score of the first document based on the detected third link.

10. The method of claim 9, were the rank score is further based on a quantity of discrete labels received for the first document from the plurality of different users.

11. The method of claim 9, further comprising:
receiving a search query;
selecting a group of matching documents from a collection of documents based on the search query, where the group of matching documents includes the first document; and
presenting one or more documents of the group of matching documents, where a position of the first document, among the presented one or more documents, is based on the rank score assigned to the first document.

12. A search system, comprising:
one or more computer devices to:
represent a first relationship between the first document and a second document as a first link between the first document and the second document, where the first relationship includes at least one of:
the first document and the second document sharing a same hierarchical user- defined label,
the first document and the second document being associated with a same sub- directory, or
the first document and the second document being associated with a same bookmark folder;
represent a second relationship between the first document and the third document as a second link between the first document and a third document, where the second relationship includes at least one of:
a hierarchical user-defined label, associated with the first document, and a hierarchical user-defined label, associated with the third document, being sibling labels,
a sub-directory, associated with the first document, and a sub-directory, associated with the third document, being sibling sub-directories, or
a bookmark folder, associated with the first document, and a bookmark folder, associated with the third document, being sibling bookmark folders;
assign a rank score to the first document based on the first link and based on the second link, where the first link contributes more to the rank score than the second link;
representing, using one or more processors associated with the one or more computer devices, a second relationship between the first document and a third document as a second link between the first document and the third document, where the second relationship includes at least one of:
- a hierarchical user-defined label, associated with the first document, and a hierarchical user-defined label, associated with the third document, being sibling labels,
- a sub-directory, associated with the first document, and a sub-directory, associated with the third document, being sibling sub-directories, or
- a bookmark folder, associated with the first document, and a bookmark folder, associated with the third document, being sibling bookmark folders;

assigning, using one or more processors associated with the one or more computer devices, a rank score to the first document based on the first link and based on the second link, where the first link contributes more to the rank score than the second link;

receiving, using one or more processors associated with the one or more computer devices, a search query;

generating, using one or more processors associated with the one or more computer devices, an information retrieval score for the first document based on the search query;

generating, using one or more processors associated with the one or more computer devices, a total rank score for the first document based on the assigned rank score and based on the generated information retrieval score; and receive a search query;

select a group of matching documents from a collection of documents based on the search query, where the group of matching documents includes the first document; and present one or more documents of the group of matching documents, where a position of the first document, among the presented one or more documents, is based on the rank score assigned to the first document.

13. The search system of claim 12, where the one or more server devices are further to:
present a user interface for receiving the search query, where the user interface includes hyperlinks relating hierarchical user-defined labels, bookmarks, or sub-directories associated with a particular document.

14. The search system of claim 13, where the user interface further includes a hyperlink to allow a user to edit the hierarchical user-defined labels, bookmarks, or sub-directories.

15. One or more memory devices that stores instructions executable by one or more processors, the one or more memory devices comprising:
one or more instructions to receive labels for a first document from a plurality of different users;
one or more instructions to detect a first link between the first document and a second document, based on at least one of the received labels matching a label associated with the second document;
one or more instructions to detect a second link between the first document and a third document, based on at least one of the received labels and a label, associated with the third document, being sibling labels;
one or more instructions to assign a rank score to the first document based on the first link and based on the second link, where the first link contributes more to the rank score than the second link, and where the rank score is further based on a quantity of the different users;
one or more instructions to detect a third link between the second document and a fourth document, based on the second document and the fourth document sharing a same label that is not shared by the first document; and
one or more instructions to modify the rank score of the first document based on the detected third link.

16. The one or more memory devices of claim 15, where the rank score for the first document is further based on rank scores associated with other documents associated with labels that match the at least one of the received labels.

17. The one or more memory devices of claim 16, where the rank score for the first document is based on a sum of values, where each value is a ratio of a rank score associated with one of the other documents and a number of documents sharing a label with the one of the other documents.

18. A method performed by one or more computer devices, the method comprising:
retrieving, using one or more processors associated with the one or more computer devices, hierarchical user-defined labels assigned to a first document;
representing, using one or more processors associated with the one or more computer devices, a first relationship between the first document and a second document as a first link between the first document and the second document, where the first relationship includes at least one of:
the first document and the second document sharing a same hierarchical user-defined label,
the first document and the second document being associated with a same sub-directory, or
the first document and the second document being associated with a same bookmark folder;
presenting, using one or more processors associated with the one or more computer devices, one or more documents selected from a collection of documents, where the one or more presented documents include the first document and where a position of the first document among the one or more presented documents is based on the generated total rank score.

19. The method of claim 18, where the presenting the one or more documents comprises presenting references for the one or more documents, where the references include a title and a text excerpt from the particular document.

20. The method of claim 18, where the assigning a rank score comprises increasing the rank score of the first document if the first document has hierarchical user-defined labels assigned to the first document by a plurality of different users.

21. A system comprising:
one or more computer devices to:
select a first document;
represent a first relationship between the first document and a second document as a first link between the first document and the second document, where the first relationship includes at least one of:
the first document and the second document sharing a same hierarchical user-defined label,
the first document and the second document being associated with a same sub-directory, or
the first document and the second document being associated with a same bookmark folder;
represent a second relationship between the first document and a third document as a second link between the first document and the third document, where the second relationship includes at least one of:
a hierarchical user-defined label associated with the first document and a hierarchical user-defined label associated with the third document being sibling labels,
a sub-directory associated with the first document and a sub-directory associated with the third document being sibling sub-directories, or a bookmark folder associated with the first document and a bookmark folder associated with the third document being sibling bookmark folders; and assign a rank score to the first document based on the first link and based on the second link, where the first link contributes more to the rank score than the second link.

22. The system of claim 21, where the hierarchical user-defined label is assigned to the first document by a number of unique users.

23. The system of claim 21, where the rank score assigned to the first document is based on a rank score of the second document and a rank score of the third document.

24. The system of claim 21, where the one or more computer devices are further to:
represent a third relationship between the second document and a fourth document as a third link between the second document and the fourth document, where the third relationship includes the second document and the fourth document sharing a same hierarchical user-defined label that is not shared by the first document; and
modify the rank score of the first document based on the third link and based on a rank score associated with the fourth document.

25. The system of claim 24, where the fourth document is one of a number of intermediary documents, where each of the intermediary documents shares at least one hierarchical user-defined label with at least one other intermediary document.

26. The system of claim 21, where the one or more computer devices are further to:
determine, for the first document, a number of other documents that share the same user-hierarchical label with the first document, are associated with the same sub-directory as the first document, or are associated with the same bookmark folder as the first document; and
where the rank score assigned to the first document is further based on the number of other documents.

27. The system of claim 21, where the one or more computer devices are further to:
receive a search query from a user;
identify the first document based on the received search query;
calculate an information retrieval score for the first document;
calculate a total score for the first document based on the information retrieval score and the assigned rank score; and
provide, for display, the first document together with other identified documents to the user, where a position of the first document among the other identified documents is based on the total score.

28. A system comprising:
one or more computer devices to:
receive labels for a first document from a plurality of different users;
detect a first link between the first document and a second document, based on at least one of the received labels matching a label associated with the second document;
detect a second link between the first document and a third document, based on at least one of the received labels and a label associated with the third document being sibling labels;
assign a rank score to the first document based on the first link and based on the second link, where the first link contributes more to the rank score than the second link, and where the rank score is further based on a quantity of the plurality of different users;
detect a third link between the second document and a fourth document, based on the second document and the fourth document sharing a same label that is not shared by the first document; and
modify the rank score of the first document based on the detected third link.

29. The system of claim 28, were the rank score is further based on a quantity of discrete labels received for the first document from the plurality of different users.

30. The system of claim 28, where the one or more computer devices are further to:
receive a search query;
select a group of matching documents from a collection of documents based on the search query, where the group of matching documents includes the first document; and
present one or more documents of the group of matching documents, where a position of the first document, among the presented one or more documents, is based on the rank score assigned to the first document.

31. A method performed by one or more computer devices, the method comprising:
representing, by at least one of the one or more computer devices, a first relationship between the first document and a second document as a first link between
the first document and the second document, where the first relationship includes at least one of:
the first document and the second document sharing a same hierarchical user-defined label,
the first document and the second document being associated with a same sub-directory, or
the first document and the second document being associated with a same bookmark folder;
representing, by at least one of the one or more computer devices, a second relationship between the first document and the third document as a second link between the first document and a third document, where the second relationship includes at least one of:
a hierarchical user-defined label, associated with the first document, and a hierarchical user-defined label, associated with the third document, being sibling labels,
a sub-directory, associated with the first document, and a sub-directory, associated with the third document, being sibling sub-directories, or
a bookmark folder, associated with the first document, and a bookmark folder, associated with the third document, being sibling bookmark folders;
assigning, by at least one of the one or more computer devices, a rank score to the first document based on the first link and based on the second link, where the first link contributes more to the rank score than the second link;
receiving, by at least one of the one or more computer devices, a search query;
selecting, by at least one of the one or more computer devices, a group of matching documents from a collection of documents based on the search query, where the group of matching documents includes the first document; and
presenting, by at least one of the one or more computer devices, one or more documents of the group of matching documents, where a position of the first document, among the presented one or more documents, is based on the rank score assigned to the first document.

32. The method of claim 31, further comprising:
presenting a user interface for receiving the search query, where the user interface includes hyperlinks relating hierarchical user-defined labels, bookmarks, or sub-directories associated with a particular document.

33. The method of claim 32, where the user interface further includes a hyperlink to allow a user to edit the hierarchical user-defined labels, bookmarks, or sub-directories.

34. A system comprising:
one or more computer devices to:
retrieve hierarchical user-defined labels assigned to a first document;
represent a first relationship between the first document and a second document as a first link between the first document and the second document, where the first relationship includes at least one of:
the first document and the second document sharing a same hierarchical user-defined label,
the first document and the second document being associated with a same sub-directory, or
the first document and the second document being associated with a same bookmark folder;
represent a second relationship between the first document and a third document as a second link between the first document and the third document, where the second relationship includes at least one of:
a hierarchical user-defined label, associated with the first document, and a hierarchical user-defined label, associated with the third document, being sibling labels,
a sub-directory, associated with the first document, and a sub-directory, associated with the third document, being sibling sub-directories, or
a bookmark folder, associated with the first document, and a bookmark folder, associated with the third document, being sibling bookmark folders;
assign a rank score to the first document based on the first link and based on the second link, where the first link contributes more to the rank score than the second link;
receive a search query;
generate an information retrieval score for the first document based on the search query;
generate a total rank score for the first document based on the assigned rank score and based on the generated information retrieval score; and
present one or more documents selected from a collection of documents, where the one or more presented documents include the first document and where a position of the first document among the one or more presented documents is based on the generated total rank score.

35. The system of claim 34, where, when the one or more computer devices are to present the one or more documents, the one or more computer devices are further to:
present references for the one or more documents, where the references include a title and a text excerpt from the one or more documents.

36. The system of claim 34, where, when the one or more computer devices are to assign a rank score, the one or more computer devices are to:
increase the rank score of the first document if the first document has hierarchical user-defined labels assigned to the first document by a plurality of different users.

* * * * *

UNITED STATES PATENT AND TRADEMARK OFFICE
CERTIFICATE OF CORRECTION

PATENT NO.        : 8,090,736 B1
APPLICATION NO.   : 11/024966
DATED             : January 3, 2012
INVENTOR(S)       : Sean Michael Knapp et al.

It is certified that error appears in the above-identified patent and that said Letters Patent is hereby corrected as shown below:

Column 12, claim 12, delete lines 66-67;

Column 13, claim 12, delete lines 1-28;

Column 14, claim 18, delete lines 30-36 and replace with the following:

--representing, using one or more processors associated with the one or more computer devices, a second relationship between the first document and a third document as a second link between the first document and the third document, where the second relationship includes at least one of:

a hierarchical user-defined label, associated with the first document, and a hierarchical user-defined label, associated with the third document, being sibling labels, a sub-directory, associated with the first document, and a sub-directory, associated with the third document, being sibling sub-directories, or a bookmark folder, associated with the first document, and a bookmark folder, associated with the third document, being sibling bookmark folders;

assigning, using one or more processors associated with the one or more computer devices, a rank score to the first document based on the first link and based on the second link, where the first link contributes more to the rank score than the second link;

receiving, using one or more processors associated with the one or more computer devices, a search query;

generating, using one or more processors associated with the one or more computer devices, an information retrieval score for the first document based on the search query;

Signed and Sealed this
Fourteenth Day of February, 2012

David J. Kappos
*Director of the United States Patent and Trademark Office* generating, using one or more processors associated with the one or more computer devices, a total rank score for the first document based on the assigned rank score and based on the generated information retrieval score; and presenting, using one or more processors associated with the one or more computer devices, one or more documents selected from a collection of documents, where the one or more presented documents include the first document and where a position of the first document among the one or more presented documents is based on the generated total rank score.--